United States Patent [19]

Stoll et al.

[11] Patent Number: 4,529,214
[45] Date of Patent: Jul. 16, 1985

[54] GASKET

[76] Inventors: Kurt Stoll, Lenzhalde 72, 7300 Esslingen, Fed. Rep. of Germany; Hans-Heinrich Glättli, Seestrasse 252, CH-8700 Küsnacht, Switzerland

[21] Appl. No.: 590,784

[22] Filed: Mar. 19, 1984

[30] Foreign Application Priority Data

Mar. 25, 1983 [DE] Fed. Rep. of Germany ....... 3310893

[51] Int. Cl.³ ............................................. F16L 47/00
[52] U.S. Cl. ............................. 277/212 F; 285/137 R
[58] Field of Search ...................... 285/137 R, 137 A; 277/212 F

[56] References Cited

U.S. PATENT DOCUMENTS

| 2,265,615 | 12/1941 | Stalter | 277/212 F |
| 3,179,443 | 4/1965 | Staffel | 285/137 R |
| 3,469,863 | 9/1969 | Riester et al. | 285/137 R |
| 3,933,379 | 1/1976 | Pontigny | 285/137 R |

Primary Examiner—Robert I. Smith
Attorney, Agent, or Firm—McGlew and Tuttle

[57] ABSTRACT

A gasket or seal fitting is made up of a generally flat sheet member or base with at least one pair of sealing spigots. The spigots of the or each pair are molded with the sheet member so as to be sticking out in line with each other from the sheet member on its two sides. There is a hole running through two such paired spigots from the outer end of one spigot to the outer end of the other spigot of the pair. The spigots have sealing beads running round them for making sealing contact with the bores of ports that are to be joined up with the fitting. The beads have a half circular cross section. The fitting may be made of an elastomer and more specially a urethane elastomer. The preferred field of use of the fitting is in fluid control systems and fluid circuits for producing connections between an adapter block and a component run on fluid power. The fitting may furthermore be used as a connection between female connectors.

9 Claims, 5 Drawing Figures

GASKET

BACKGROUND OF THE INVENTION

The present invention is with respect to sealing or gasket fittings, and more specially to such a fitting having at least one spigot thereon.

In the prior art such gaskets have been used more specially for producing connections between loads to be supplied with fluid under pressure and parts of the system supplying such power, as for example pumps or accumulators. One field of use is in connection with fittings for joining up hydraulic or pneumatic components, more specially logical circuits running on fluid under pressure and the sensors and loads used therewith. Such components normally have a housing with a number of connection ports in one of more outer faces thereof. The ports are used for joining up with connection ducts, and for making such joints gaskets, as for example gaskets in the form of washers, are needed. Such washer-like gaskets may for example be o-rings. The are fitted in a great number of different positions on the hydraulic or pneumatic component against a sealing seat round the space within the port. To get a sealing effect the sealing washers are acted upon by some form of deforming force pushing them against the seat in sealing contact therewith so that there is no chance of any fluid being let off through the seal so formed. Normally gasket rings are placed on the outer side of the component and they have to be squeezed by a force before they give their sealing effect. The gasket rings are kept in place in ring-like grooves running round the ports for making the connections with the connection ducts. The ducts have an end flange for pushing the gasket against the sealing seat face so that the gasket ring in question is deformed.

Such a gasket system has a number of different shortcomings. On the one hand the gasket rings take up space on the outer face of the component so that the designer of such systems has to keep a certain amount of space between the ports and this is likely to make the component unnecessarily large. Having grooves or other cutouts in the component to put the gaskets in makes production relatively complex because a high quality surface then has to be produced. A key question in connection with the form of such systems is the part of the design for producing the desired gasket-deforming force. To make certain of getting a good enough sealing effect the deforming force needed has to be very much greater than the fluid pressure acting by way of the sum of the acting faces, that is to say the force having the tendency of separating the component from the duct joined to it. Every increase in the working pressure of the fluid makes a higher sealing force necessary at the gasket. When a gasket is put in place, the housing of the component has to take up the deforming forces acting on the gasket; for this reason the housing has to be designed to be so strong that it is resistant to such forces and it will not be bent. In the case of a flanged joint there is furthermore the question of fixing the flange in place. In this case it is normal to have threaded holes which have to be very large in size because of the high pulling forces that have to be taken up. For these reasons a housing with known forms of gaskets to make connection with the hydraulic or pneumatic system in the housing has to be large in its overall size and the process of manufacturing it is likely to be slow and only possible if a certain amount of material is wasted and not put to any good use.

These design troubles are more specially serious if in the field of application in question attempts are being made at standardization of such pressure fluid connections. For example in the fluidics art standardized fluid connections in the form of plug connectors have been designed. To make a connection between such plug connectors and the separate, different pressure fluid connections of the active and passive fluid components, so-called adapter blocks have to be used, which on one connection face have fluid port means in the normal standard positions and on a further face have port means that are customized to be in line with the geometry of the component. Between the two faces, the body of the adapter block has ducts in it. Plug connectors, and more specially multipole connectors, for use with such adapter blocks as so far designed have certain shortcomings, that is to say, the male and female connection parts are quite different in form so that the price of manufacturing them is high. On the other hand the male and female pieces have to have loose, moving fluid connection parts to take care of inaccuracies in manufacture and give a fully fluid-tight sealing effect. Known plug-in connectors are complex to make and to put together in other respects as well because they are made up of so many single parts. Fixing them on the adapter blocks is not possible without further fastening means as for example threaded bushes, that take up space that might otherwise be used for the connection ducts. In these respects there are the same shortcomings as with widely used gaskets that have to be squeezed to before any sealing effect is produced.

GENERAL OUTLINE OF THE INVENTION

One purpose of the present invention is to put an end to the shortcomings of known designs as noted.

A further purpose of the invention is that of designing a gasket or sealing member that makes it possible for the ports of fluid components and adapter blocks to be placed much nearer to each other than in the prior art so that there is a saving in space and in material.

As part of a still further purpose of the invention the gasket is to be so fashioned that deforming forces necessary to make it give a sealing effect may be simply produced by the housing of the component without the housing having to be overly complex in design, as for example be cause of the use of screws and other moving parts and so that it may be light in weight.

Furthermore the invention is to make it possible for the two halves of a plug connector to be the same and the sealing effect is to to go up automatically with an increase in the fluid pressure so that in fact there will be a positive sealing effect. Or putting it differently, the sealing force is a positive function of the working pressure in the fluid system.

Moreover inaccuracies in manufacture are to be taken care of without using loose parts.

For effecting these and further purposes and objects that will become clear on further reading of the present specification and claims, the gasket of the invention is made up of a sheet or plate with sealing spigots running out from its two sides in pairs. The spigots in each such pair on the two sides of the sheet are placed in line with each other and have a common hole or fluid passageway running through them. The spigots each have at least one ring-like bead or ring running round them to give the desired sealing effect.

The sealing fitting in keeping with the invention is placed between the fluid (that is to say hydraulic or pneumatic) components. The sheet of the fitting comes up against connection faces of the components so that the sealing spigots are taken up in the ports that are to be joined together and which are put in line with each other for assembly. The ring-like beads on the spigots then come into contact with the inner faces of the ports to make a sealing connection in each case inasfar as the beads are acted upon by radial forces for deforming them because the beads are pushed inwards by the bore of the ports. In keeping with a preferred part of the invention at least part of the face of the sheet or plate of the fitting is not in sealing contact with the components; it is then possible for any fluid leaking past the beads to be run off without being any trouble. The plate or sheet resting against the connection-forming face may however have the further function of covering over and sealing off shallow channels. The spigots have furthermore the function of locking the sealing sheet in the ports, if it is designed for this purpose, and if there are no shallow channels present in the surface to be sealed off, it will regularly be the case that no further or only a very little further pressing force will be needed to be certain of producing a sealing connection. The sealing or gasket fitting in keeping with the present invention may more specially be used for use between pneumatic components and adapter blocks and/or generally for plug connection in fluid systems.

Further details of the invention will be seen from the account now to be given of two working examples of the invention as presented in the figures herein.

LIST OF THE DIFFERENT VIEWS IN THE FIGURES

Figure 4:
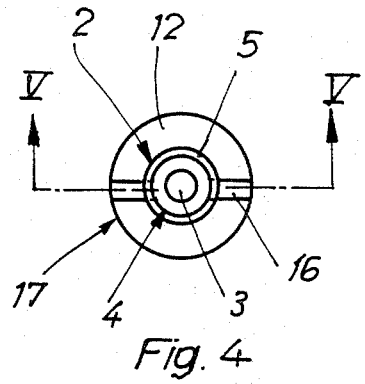

FIG. 4 4 is a plan view of a second working example of the sealing fitting in keeping with the invention.

Figure 5:
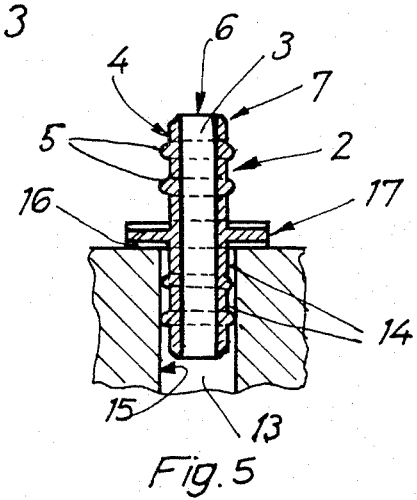

FIG. 5 5 is a section through the fitting taken on the line V—V of FIG. 4.

DETAILED ACCOUNT OF THE WORKING EXAMPLES OF THE INVENTION

Figure 1:
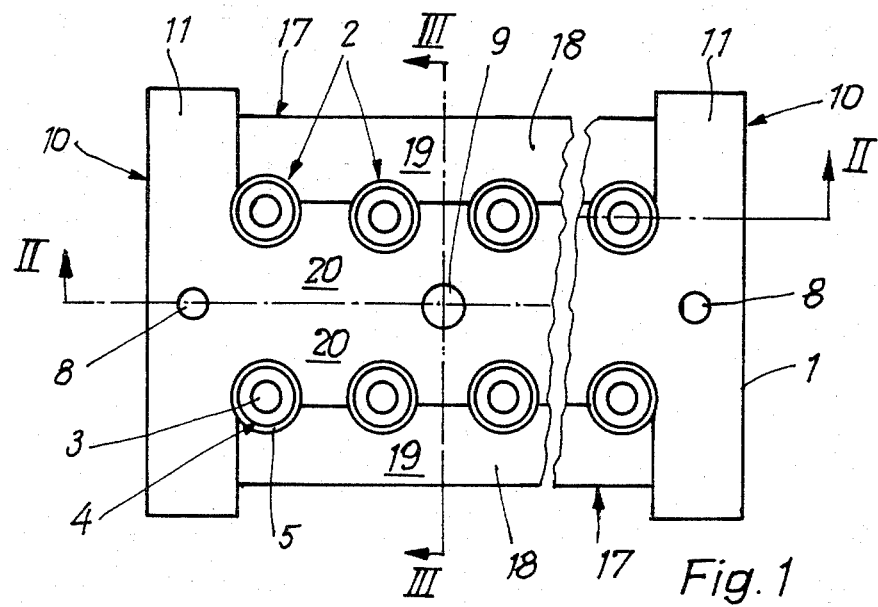
FIG. 1 is a view looking down on a first working example of the sealing or gasket fitting in keeping with the invention.
Figure 2:
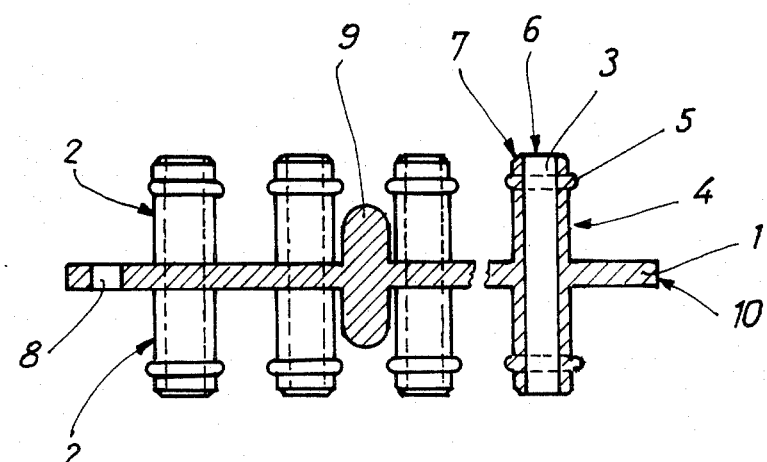
FIG. 2 is a section through the said fitting taken on the line II—II of FIG. 1.

On firstly turning to FIGS. 1 and 2 it will be seen that the seal or gasket in keeping with the present invention has a plate or sheet 1. On this sheet 1 a number of sealing connections or spigots 2 are formed or molded so as to be placed in pairs. In the present working example the sealing spigots 2 are placed in two lines or rows that are parallel to each other, such rows running in direction of the longer sides of the plate 1. The rows of sealing spigots 2 are symmetrical in relation to a middle plane running parallel to the longer sides so that the pairs of spigots in the one row are opposite the pairs thereof in the other row. The sealing spigots 2 of a pair have a hole 3 running right the way through them from end to end and all the middle holes 3 to be seen in FIG. 1 and distributed over the area of the sheet 1 are designed for use with separate port connections that are sealed off by spigots of the sealing fitting. The working example of the invention to be seen in FIGS. 1 and 2 may from this be seen to be a multiple fitting for a large number of port connections. The number and the spacing of the connections are in this respect dependent on the number of components to be joined up, that in this respect will have been standardized, at least in part. From this it will be seen that different designs of sealing fittings in keeping with the invention may be produced, the only difference between them in the main being the different linear dimensions.

As will be seen from FIG. 2, for each of the connections between ports to be produced there are the two sealing spigots 2, sticking out from the two opposite sides of the sheet 1 so that the two spigots of each pair thereof are in line with each other with the middle hole running through them from the outer end of one spigot, through the sheet and out to the outer end of the other spigot of said pair so as to make a fluid connection between the two sealing spigots 2. For joining up two fluid components the sealing spigots 2 as male elements are slipped into connection ports or holes 13 (as seen in FIG. 5), such ports being in the connection faces or surfaces of the components. In the put-together condition of the sealing fitting of the present invention the ports of the two components are lined up with each other and each spigot of a pair of spigots 2 is taken up in one of the connection ports 13 or holes. In the joined-together position the two sides faces of the sealing sheet 1 will be resting directly against the ported or connection faces of the components. In this position it may be used with the function of a cushioning or springing element between the components without necessarily being in sealing contact therewith so that, more specially, mechanical jerks or impacts as produced by switching operations may be deadened. Moreover it is possible to have channels cut into the ported faces of the components, that in the fitted condition of the fitting will be covered by the sheet 1 and sealed off from each other. The sheet 1 is locked in place by the sealing spigots 2 on the components, that are joined together; the spigots have the function of sealing locking plugs in the ports.

Figure 3:
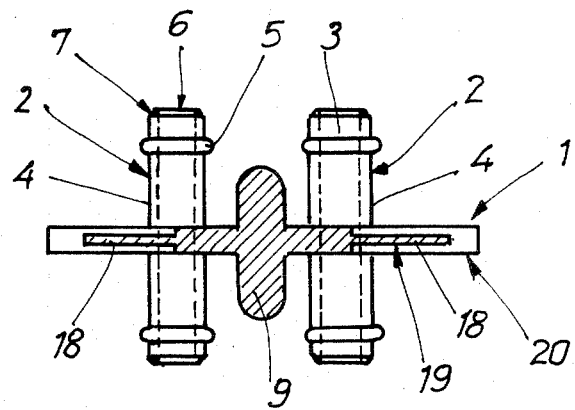
FIG. 3 is a section through the gasket fitting taken on the line III—III of FIG. 1.

To make this possible the sealing spigots 2 each have at least one sealing bead 5 running round and sticking out from the outer face of the spigot 2 in question. In the working example of the invention presented in FIGS. 1 to 3 one single sealing bead 5 is present on each spigot 2; but however as may be seen from FIG. 4 for example it possible to have two or more such ring-like or annular beads 5 on each of the connectors. The ring beads 5 are centered on the middle hole 3 running though the spigot and are spaced out some distance from the sheet 1. In keeping with a preferred form of the invention they have half-round outline as seen in section, the rounded part of the outline facing in an outward direction away from the axis of the spigot in question. Such a ring-like bead 5 has generally the same sealing function as a ring of cord or some other material with a round section and of known design. It is in fact possible for the ring-like bead to be thought of as such a ring, that is however partly formed in the material of the connection 2. The sealing of the spigot 2 in the port of the component coming into question is best done by the common deformation of the spigot 2 and of the ring-like or annular bead 5 thereon.

The outer diameter of the sealing spigot 2 and the thickness of the beads 5 as measured in the radial direction are preferably so matched to the cross section of the connection holes 13 that the sealing effect is more or less completely limited to the ring-like beads 5 and at other positions there is a play between the outer cylindrical surface or face 4 of the sealing connection 2 and in the bore 15 of the connection port 13 (see FIG. 5). The said outer face 4 of the sealing spigot 2 is in fact smaller in its diameter than the size of the diameter connection port 13 to be joined up therewith. Because this is the case, the base or foot part of the sealing spigot 2 near the sheet 1 may be moved to some degree in the port 13. This system makes it possible for joints to be made with connection ports 13 which are not as accurately produced as might be desired and not truly lined up with each other.

Any fluid making its way out of the sealing spigot 2 will naturally enough be responsible for producing a radial pushing force on the ring-like bead 5 so that a positive sealing effect is produced. Any fluid leaking out past the ring-like bead 5 and making its way into the space 14 between the sealing spigot 2 and the bore of the connection port 13 on the far side of the bead 5 would put up the pressure at this point so that the positive sealing effect would be decreased. However, in keeping with the present invention the system is designed to let off fluid (for example air) from the outer part round the sealing spigot 2 between the ring-like bead 5 and the sheet 1 towards the edge thereof. Turning more specially to FIG. 4 it would be possible for this purpose for channels 16 to be cut in the sheet 1 for use with the separate sealing spigots 2, such channels 16 running from the foot of each sealing connector 2 to the edge 17 of th sheet 1. As will be clear from FIGS. 1 and 3, the sheet 1 may however have flat parts 18 with a smaller thickness between the feet of the sealing spigots 2 and the edge 17 of the edge 17 of the sheet so that the faces of the flat parts 18 are nearer the plane at the center of the thickness of the sheet 1 than other parts of its surface at 20 that is to be rested against the ported faces of the components. In both the possible systems openings for leaking air are produced so that such air is let off into the outside atmosphere without having any undesired effects on the positive sealing effect.

Each sealing spigot 2 and the ring-like bead 5 thereon are made with such a diameter that it may be slipped into the connection port 13 of the said component with only a small degree of squeezing and deformation of the material. To make it simpler for the sealing spigot 2 to be fitted into the connection port 13 there is something to be said for its being chamfered at 7 at its end 6 so that the outer face 4 becomes frusto-conically narrower at the end 6. Supporting the sealing spigot 2 so that this somewhat conical end comes first, the spigot is pushed into the component in question and at the latest by the time the ring-like beads 5 are pushed into the port there will be a radially inward deformation of the sealing spigot 2, such deformation being made possible by the elastic nature of the sealing material. At the same time the deformation makes certain of getting the first pressure-contact between the ring-like bead 5 and the bore of the connection port so that there is the necessary sealing effect. The material of which the sealing gasket in keeping with the invention is made is such that it is in line with the needs with respect to deformability and rebound resilience; preferably, the sealing fitting or gasket is made in the form of one piece of synthetic resin with soft properties, such material being more specially in the form of an elastomer such as Perbunan, neoprene or a urethane elastomer. In this design, in which the sheet or base 1 is made of elastic material as well, the gasket does not have to be made with great dimensional stability. In the manufacturing process it is possible for materials with different degrees of shrinkage to be process in one and the same tool.

The placing of the ring-like beads 5 in keeping with the invention on the sealing spigots 2 make certain of getting a first rate connection between the sealing fitting and the fluid components that are to be joined up. The acting forces that are needed for causing the deformation of the ring-like bead 5 may be taken up without any trouble by the solid material of the components next to the connection ports therein and without any overly great strain being produced; the spacing needed in this connection between the connection ports is very much less than in a system ring-like seals placed on the ported surface of the component. The sealing spigot sticking out from the plane of the sheet 1 furthermore has the effect of putting the point of sealing at a greater distance from the ported face of the component in question. For this reason it is possible for the ported face itself to be made flat or for channels to be cut into it without this being likely to have any effect whatever on the seals. If there are no such channels to be sealed off by the sheet 1 the ported surfaces do not have to be produced with any specially high quality or finish, seeing that they do not take part in any sealing function. It is only the bores 15 of the connection ports 13, that are naturally well safeguarded against damage and dirt, that have to have a good surface finish. The fact that the ring-like bead 5 is symmetrical about the middle hole 3 is lastly responsible for making any fluid going through the middle hole 3 put a force on the seal so that its sealing function is made even better. The undesired compression forces acting in the axial direction are on the other hand small because they are limited in their effect to small faces or areas. It is for these reasons that the invention makes possible a technically first rate sealing system that is very simple in its design.

For lining up or locating the sealing fitting in keeping with the invention and the components to which it is to be joined a number of different expedients may be devised. Turning to FIGS. 1 and 2 again, the reader will be able to see that there are center holes or cutouts 8 in the sheet 1 so that pins or fixing screws may be fitted therein. Furthermore the sheet 1 has a number of projections or heads 9 that may be plugged into holes in the components designed for this same purpose. The heads 9 are preferably made with rounded tops so that the same may be more readily slipped into the holes in the component is made simpler. In view of current attempts being made at standardization a design is preferred in which the heads 9 are placed in line with each other on the two sides of the wheel 1. The heads 9 as well and furthermore any other such special structures for lining up the parts are molded in one piece with the rest of the sealing fitting and in one and the same working step. The sheet 1 to be seen in FIG. 1 has a generally rectangular plan outline, the guide openings 8 and the head 9 being placed on the middle line running along the sheet in the direction of its greater length. At its cross ends or shorter sides 10 the sheet 1 has ears 11 molded on it to make it broader, such ears 11 forming a larger support face that makes certain that the fitting is better kept in its desired position.

In FIGS. 4 and 5 the reader will be able to see a working example of the invention in the form of a single seal for one single connection. Parts of it that are the same as parts of the other constructions are marked with the same part numbers. The sheet 1 of the sealing fitting has only one single pair of spigots 2 lined up with each other and running outwards from two opposite sides of the sheet 1. There is a single hole 3 running right the way through the spigots from end to end. The plate 1 has the form of a collar 12 as a ring running round and centered on the sealing spigots. This collar 12 is rested like a flange against the ported faces of the components to be joined together, the presence of the collar or flange therebetween more specially giving a springing or cushioning effect between the two components. The single seal to be seen in FIGS. 4 and 5 is more specially to be used in those cases in that the surface form or quality of the components is unimportant and when the ports are not placed in a standardized pattern; in this last-named case it is more specially possible as well to have round cutouts to a certain depth round the ports to take up part or even all of the thickness of the collar in question when the sealing fitting is in its working position. As we have seen, the sealing spigots 2 as in FIG. 5 have two ring-like concentric beads 5, that are spaced from each other. When there are so many ring beads 5 the sealing effect will be better than with a single bead. The use of two beads on each spigot is naturally enough not limited to a sealing fitting with one pair of spigots only as FIGS. 4 and 5 and in fact the sealing spigots of a multiple duct sealing gasket as in FIGS. 1 to 3 may each have more than two ring-like beads 5. Furthermore it would be possible for a sealing fitting to be manufactured with a single ring-like bead 5 on each sealing spigot 2, although this is not marked in the figures.

The sealing spigots 2 are responsible not only for a sealing effect but furthermore for a mechanical locking or joining together of the sealing fitting in keeping with the invention to keep it in place on the components that are to be joined up fluidwise. By the right selection of the size of the sealing spigots 2 and of the ring-like beads 5 it is possible to get a great enough gripping effect on the components, that is to say the spigots are tightly kept in place in the ports. Then further assembly operations are not needed and the components are simply joined together using the gasket fitting of the invention by itself and plugging it into them. It is more specially the case with large flat channel structures that a useful effect is to be had by putting the plate 1 of the sealing fitting under a greater pressing force as produced by some outside part of the fitting; the bearing forces which then have to be produced to get the sealing effect are in this case however very much less, and may be designed for very much more simply, than in the case of flat seal placed between the components.

A preferred field of use of the gasket in keeping with the invention is in fluid circuits and the like for producing a joint between an adapter block and a pneumatic component such that the joint may be undone readily. The adapter blocks have fluid ports in one face thereof in a standardized pattern and one the opposite ported face the ports are in a customized pattern. It is in these ports that the sealing fitting of the invention with the sealing spigots 2 on one side thereof is placed so that the ring-like beads 5 give the desired sealing effect. For this form of sealing system it is not necessary for the connection ports to be specially formed; in fact the connection ports or holes may be cylindrical. For the fixing in position of an elastomeric seal in keeping with the invention it is preferred to make use of adapter blocks that are made up of two or more parts bonded together and of which at least one is made of hard foam material with its bonded faces in a rough condition. If the parts are made of hard foamed resin there is the useful effect that surface channels may be used in the ported face of the adapter block, that is positioned against the plate 1 of the sealing fitting. These channels cut into the surface are completely sealed off by the sealing fitting from the outside so that they are ducts within the material. Integral foam material has specially good properties for producing the face on which the sealing fitting is fixed, because in the mold a strong and smooth skin is automatically formed on such material. Such a face gives a good sealing effect and makes possible laminar flow of the fluid in the system. The sandwich structure of a number of layers bonded together makes the adapter block very stiff and rigid so that there is no trouble in keeping up the loading force needed for acting on the sealing fitting of the invention, even if the overall height of the structure is low. The bonds between the separate layers have to be very strong and for increasing the strength of such bonds the hard foam resin may be mechanically roughened so that the pores therein are opened up and there is a larger area to be acted upon by the bonding material. It will be seen that the sealing fitting in keeping with the invention may very well be used with such adapter blocks. It takes up a position between the adapter block and the component to be joined thereto in which it is between the ported faces thereof so that its spigots are taken up in the lined-up ports in the adapter block and the component.

To make it simpler for the sealing fitting of the invention to be unjoined from the joined-up parts, its surfaces may be sprayed over with a lubricating material, as for example one in the form of solid particles. If one side is so conditioned, the seal on the unsprayed side will be permanently joined to the sealing fitting because of the greater stiction or the adhesive effect, whereas the other part may be readily stripped off when desired.

We claim:

1. A coupling and sealing strip for connecting hydraulic or pneumatic lines to each other, the lines having conduit bores therein, comprising:
    a plate made of elastic material and having a first flat surface and a second opposite flat surface;
    at least one pair of tubular sealing connections extending respectively from said first and second flat surfaces of said plate, and made of the same material as said plate, said pair of tubular connections extending in opposite coaxial directions and having a common bore therethrough which common bore extends through said plate, each of said pair of tubular sealing connections having an end remote from said plate and a cylindrical outer surface; and
    an annular bead defined on each tubular connection near its end and around its cylindrical surface, a diameter of said cylindrical surface chosen to be less than a diameter of a conduit bore of a line to be connected to said tubular connections and an outer diameter of said bead being at least equal to the diameter of the conduit bore;
    said plate having a recess area on each of its first and second flat surfaces extending from each of said pair of tubular sealing connections to a peripheral edge of said plate whereby fluid leaking onto one of said first and second surfaces is conducted to said periphery in one of said recessed areas, each of said pair of tubular sealing connections at least partly engaging said first and second flat surfaces respectively.

2. A coupling and sealing strip according to claim 1, wherein each of said recessed areas comprises a channel defined in said first and second flat surfaces respectively.

3. A coupling and sealing strip according to claim 1, wherein each of said recessed areas is formed by a continuous recessed area provided between said tubular connections and a periphery of said plate.

4. A coupling and sealing strip according to claim 3, wherein said plate has a straight periphery, a plurality of additional pairs of tubular connections extending from said first and second flat surfaces of said plate respectively, at least some of said pairs of tubular connections lying in a row spaced an equal amount from said straight periphery, said recessed areas formed by said plate having a thin portion thinner than a spacing between said first and second flat surfaces, extending partly around each tubular connection in said row and to said periphery.

5. A coupling and sealing strip according to claim 4 including at least one projection formed on said plate of the same material as said plate and spaced away from each of said pair of tubular connections, said projection having first and second axially aligned portions extending respectively from said first and second flat surfaces.

6. A coupling and sealing strip according to claim 5, including at least one hole extending through said plate at a location spaced from said projection and from each of said pair of tubular connections.

7. A coupling and sealing strip according to claim 6, wherein said plate includes ears at opposite ends thereof, said straight periphery and said recesses area extending between said ears, said ears carrying said first and second flat surfaces.

8. A coupling and sealing strip according to claim 7, wherein said plate is substantially rectangular and includes a second straight row of pairs of tubular connections adjacent an opposite straight periphery of said plate opposite from said first-mentioned straight periphery thereof.

9. A coupling and sealing strip according to claim 8, wherein said plate, said projection, said pairs of tubular connections and said ears are made of a single piece of elastic material chosen from the group consisting of purbunan, neoprene and polyurethane elastomer.

* * * * *